United States Patent [19]
Sharpe

[11] 3,854,578
[45] Dec. 17, 1974

[54] DOG DROPPING DISPOSAL KIT
[75] Inventor: Grace S. Sharpe, San Francisco, Calif.
[73] Assignee: The Raymond Lee Organization, New York, N.Y. ; a part interest
[22] Filed: May 7, 1973
[21] Appl. No.: 357,913

[52] U.S. Cl. .................................. 206/223, 294/1 R
[51] Int. Cl. ............................................. B65f 1/06
[58] Field of Search .................... 206/223; 294/1 R; 15/104.8, 257.1

[56] References Cited
UNITED STATES PATENTS
3,286,826  11/1966  Stoll ................................. 206/223
3,703,956  11/1972  Oswalt ............................. 206/223
3,796,453  3/1974  Grimes ........................... 294/1 R Primary Examiner—Donald F. Norton
Attorney, Agent, or Firm—Daniel Jay Tick

[57] ABSTRACT

A dog dropping disposal kit comprises a bucket. A plurality of disposable liners are provided for the bucket. A shovel stick and a plurality of disposable shovel heads, each adapted to be removably affixed to the stick, are also provided.

3 Claims, 4 Drawing Figures

PATENTED DEC 17 1974  3,854,578

DOG DROPPING DISPOSAL KIT

DESCRIPTION OF THE INVENTION

The present invention relates to a dog dropping disposal kit.

An object of the invention is to provide a dog dropping dispoal kit of simple structure, which is easy, convenient, rapid and simple to use, and which may be used to dispose of dog droppings cleanly and hygienically with facility and convenience.

In order that the invention may be readily carried into effect, it will now be described with reference to the accompanying drawing, wherein.

In the FIGS., the same components are identified by the same reference numerals.

Figure 1:
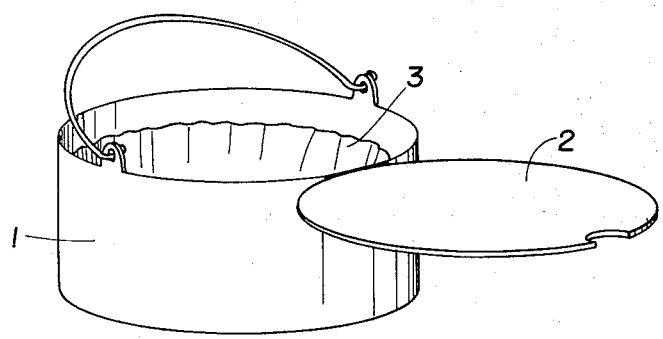
FIG. 1 is a schematic diagram of an embodiment of the bucket of the dog dropping dispoal kit of the invention.

The dog dropping disposal kit of the invention comprises a bucket 1 (FIG. 1) having a cover 2 hingedly affixed thereto (FIG. 1) and a handle (FIG. 1).

Figure 4:
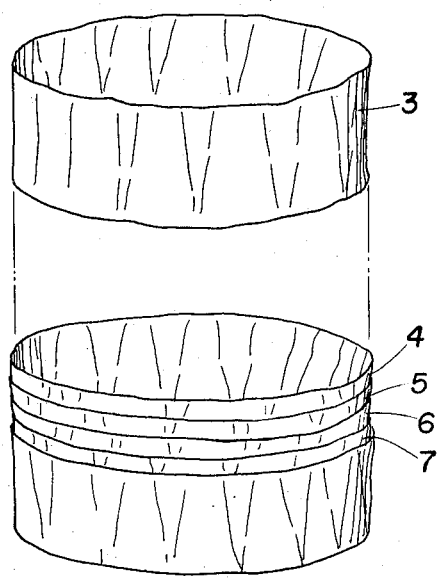
FIG. 4 is a schematic diagram of a plurality of disposable liners of the dog dropping disposal kit of the invention.

A plurality of disposable liners 3, 4, 5, 6, 7, and so on, is provided for the bucket 1 (FIG. 4).

Figure 2:
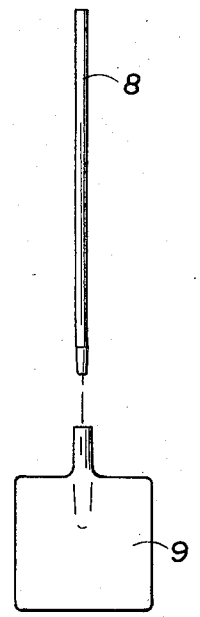
FIG. 2 is a front view of the shovel stick and a shovel head of the dog dropping disposal kit of the invention.

The dog dropping disposal kit of the invention includes a shovel stick 8 (FIG. 2).

Figure 3:
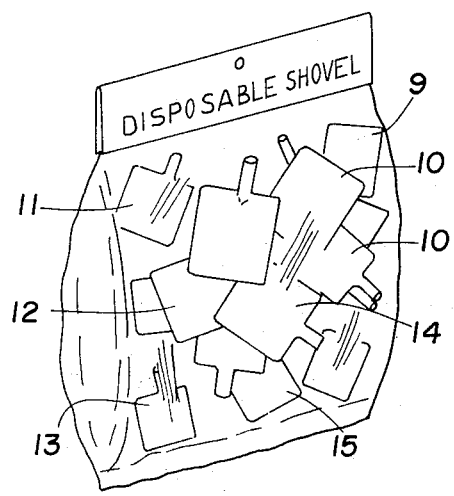
FIG. 3 is a schematic diagram of a package of a plurality of disposal shovel heads of the dog dropping disposal kit of the invention.

A plurality of disposable shovel heads 9, 10, 11, 12, 13, 14, 15, and so on, are provided in the kit of the invention (FIG. 3). Each of the shovel heads 9, 10, 11, 12, 13, 14, 15, and so on, is adapted to be removably affixed to the stick 8 (FIG. 2).

While the invention has been described by means of a specific example and in a specific embodiment, I do not wish to be limited thereto, for obvious modifications will occur to those skilled in the art without departing from the spirit and scope of the invention.

I claim:

1. A dog dropping disposal kit, comprising
   a bucket;
   a plurality of disposable liners for the bucket;
   a shovel stick; and
   a plurality of disposable shovel heads each adapted to be removably affixed to the stick.

2. A dog dropping disposal kit as claimed in claim 1, wherein the bucket has a cover.

3. A dog dropping disposal kit as claimed in claim 1, wherein the bucket has a cover hingedly affixed thereto and a handle.

* * * * *